(12) United States Patent
George

(10) Patent No.: US 6,957,241 B2
(45) Date of Patent: *Oct. 18, 2005

(54) FFT AND FHT ENGINE

(75) Inventor: Dileep George, Stanford, CA (US)

(73) Assignee: Gallitzin Allegheny LLC, Los Altos, CA (US)

( * ) Notice: Subject to any disclaimer, the term of this patent is extended or adjusted under 35 U.S.C. 154(b) by 617 days.

This patent is subject to a terminal disclaimer.

(21) Appl. No.: 10/074,629

(22) Filed: Feb. 14, 2002

(65) Prior Publication Data
US 2003/0152164 A1 Aug. 14, 2003

(51) Int. Cl.⁷ .............................................. G06F 17/14
(52) U.S. Cl. ....................................... 708/400; 708/404
(58) Field of Search ................................ 708/400, 401, 708/402, 403, 404, 405, 406, 408, 409; 375/260

(56) References Cited

U.S. PATENT DOCUMENTS

| | | | | |
|---|---|---|---|---|
| 4,689,762 A | * | 8/1987 | Thibodeau, Jr. | 708/409 |
| 5,339,265 A | * | 8/1994 | Liu et al. | 708/400 |
| 5,959,875 A | * | 9/1999 | Kawahara et al. | 708/821 |
| 6,130,915 A | * | 10/2000 | Hallier et al. | 375/260 |

* cited by examiner

*Primary Examiner*—Chuong D Ngo
(74) *Attorney, Agent, or Firm*—Trop, Pruner & Hu, P.C.

(57) ABSTRACT

A transformation engine includes an address generator; a butterfly unit coupled to the address generator; a twiddle LUT coupled to the address generator; and a multiplier having a first input coupled to the butterfly unit and a second input coupled to the twiddle LUT.

16 Claims, 6 Drawing Sheets

APPENDIX

FFT AND FHT ENGINE

BACKGROUND

Spread spectrum techniques are well known. In a typical spread-spectrum communication system, transmitted bits are replaced by a spreading sequence, which are stored in a receiver. During transmission, received samples are correlated with the stored sequence to determine the transmitted bits. For a spread-spectrum system using Walsh Codes, the receiver would typically correlate the received samples with all possible Walsh Codes of the same length. Such an operation can be efficiently implemented using a Fast Hadamard Transform.

In another trend, OFDM transmission systems are becoming ubiquitous. The major processing elements in an OFDM communication system are the IFFT and FFT blocks at the transmitter and receiver. Considerable processing power and hardware resources are required to compute the FFT/IFFTs to make the communication system run in real-time.

FFT and FHT are usually implemented in hardware to meet the real-time processing requirements for high data throughput communication systems. Typically these are implemented as separate hardware blocks. Such separate hardware takes up chip real-estate. Moreover, having separate FFT and FHT hardware increases power consumption.

SUMMARY

In one aspect, a transformation engine includes an address generator; a butterfly unit coupled to the address generator; a twiddle LUT coupled to the address generator; and a multiplier having a first input coupled to the butterfly unit and a second input coupled to the twiddle LUT.

Implementations of the above system may include one or more of the following. The butterfly unit can compute fast fourier transform (FFT) operations. The butterfly unit can compute decimation in frequency fast fourier transform (DIF FFT) operations. The butterfly unit can also compute fast Hadamard transform (FHT) operations. The twiddle LUT contains twiddle factors set to one. Input data belonging to FHT samples are mapped to predetermined inputs. Remaining input data is set to zero. An input buffer can be coupled to the butterfly unit. An output buffer can be coupled to the multiplier.

In another aspect, a method for performing a plurality of transformations includes determining a transformation operation to be performed on data; and sharing a transformation engine between multiple transformation operations.

Advantages of the invention can include one or more of the following. The system provides a Fast Hadamard Transform engine that is fast and that shares hardware with other operations in digital radio transmitters and receivers. By making use of the similarity of operations for FFT and FHT it is possible to use the same hardware to compute FFT and FHT with a small amount of reconfiguration. For multi-mode communication system, the system supports reusing hardware blocks of one protocol to perform the computations for other protocols and thus obviates the need to provide separate hardware blocks. This sharing reduces chip area and hence the cost.

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
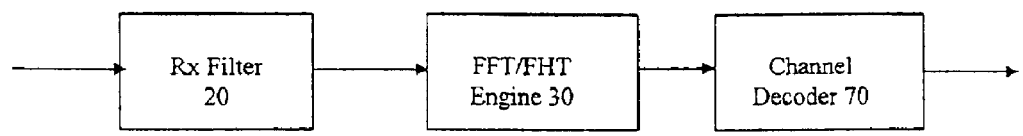
FIG. 1 shows a portion of a digital receiver.

FIG. 1 shows an exemplary receiver circuit 10. The receiver circuit 10 includes a receive filter 20 that receives digitized radio frequency signals. The filter 20 digitally removes signals outside of the receive frequency and provides the filtered data to an engine 30 that can handle both FFT and FHT operations. The output of the engine 30 is provided to a channel decoder 70.

FFT is usually used in orthogonal frequency division multiplexing (OFDM) receivers to perform sub-carrier demodulation. Fast Hadamard transformations are used in spread spectrum systems to de-correlate multiple codes simultaneously. FFT and FHT both have several similarities that can be exploited. Note the similarities between the Radix-4 FFT operations/topology and the FHT operations/topology used for CCK demodulation. The radix-4 FFT butterfly is given by:

$$\begin{pmatrix} X(0) \\ X(1) \\ X(2) \\ X(3) \end{pmatrix} = \begin{pmatrix} 1 & 1 & 1 & 1 \\ 1 & -j & -1 & j \\ 1 & -1 & 1 & -1 \\ 1 & j & -1 & -j \end{pmatrix} \begin{pmatrix} x(0) \\ x(1) \\ x(2) \\ x(3) \end{pmatrix}$$

A Radix-4 FFT butterly takes in 4 complex inputs and produces 4 complex outputs.

The FHT butterfly takes in two inputs and produces four outputs.

$$\begin{pmatrix} X(0) \\ X(1) \\ X(2) \\ X(3) \end{pmatrix} = \begin{pmatrix} 1 & 1 \\ 1 & j \\ 1 & -1 \\ 1 & -j \end{pmatrix} \begin{pmatrix} x(2) \\ x(0) \end{pmatrix}$$

The FHT butterfly takes in two inputs and produces four outputs. By inspection of the matrices, it can be seen that FHT butterfly results if x(2)=x(3)=0 in the FFT matrix.

A 64 point Radix-4 FFT has three stages. Each stage uses 16 butterflies. Each stage produces 64 outputs. The total number of input samples is 64 and the total number of output samples is 64. The 8 point FHT used in 802.11b has three stages. The first stage has 4 butterflies, the second stage has 8 butterflies and the final stage has 16 butterflies. The first stage produces 16 outputs, the second stage produces 32 outputs and the final stage produces 64 outputs.

Figure 3:
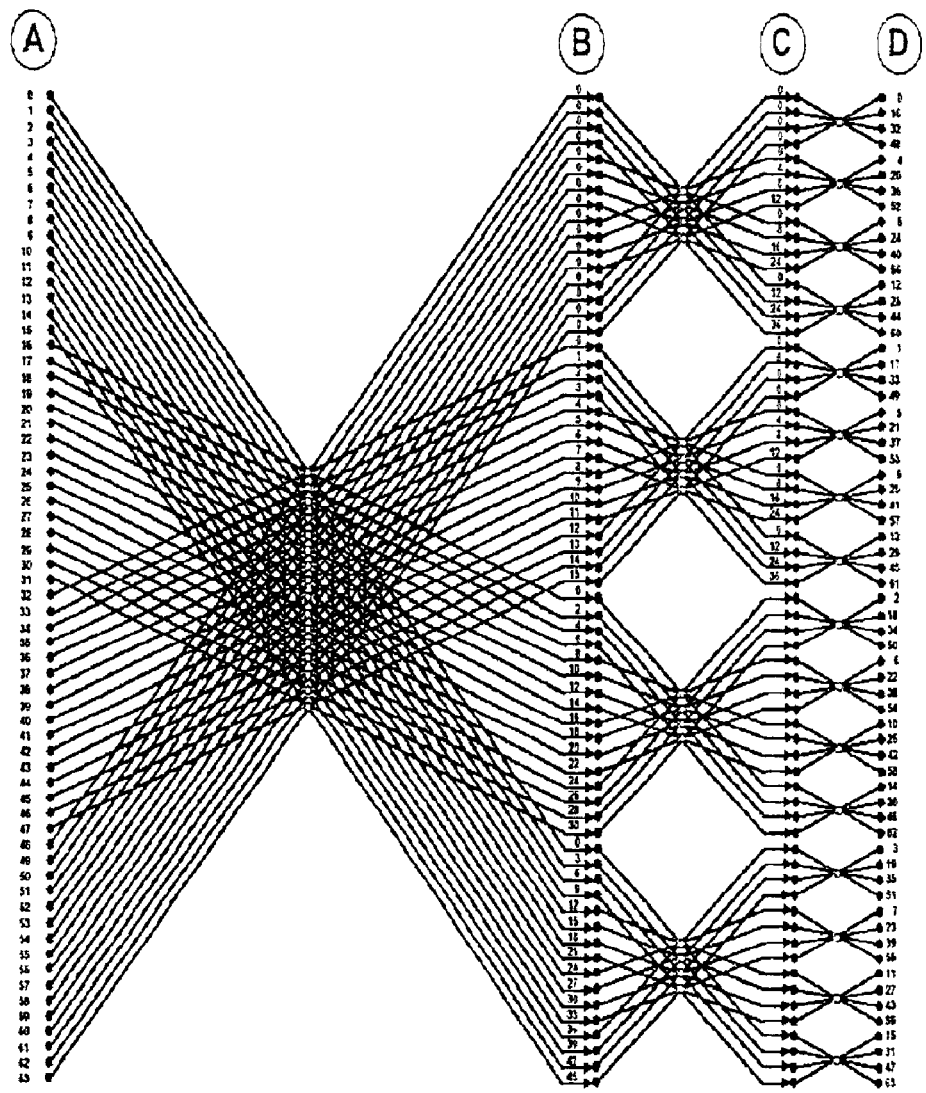
FIG. 3 shows an exemplary FFT topology.

The 64 point Radix-4 FFT takes in 64 complex inputs and produces 64 complex outputs, an example of which is shown in FIG. 3, a black-box view of the 64 point complex FFT. Internally, the operations are performed using Radix-4 butterflies and the outputs of the butterflies are multiplied by twiddle factors. As described in more detail below, the circuit of FIG. 6 reduces the area and cost by re-using the computation blocks of one receiver for performing the computations for the other. The FFT engine is reused for FHT by incorporating the following changes:

1. Set all twiddle factors equal to 1
2. Map the FHT samples to appropriate inputs
3. Set the rest of the inputs to zero.

Turning now to one implementation of the system, a Fast Hadamard Transform (FHT) takes in 8 inputs. Here the inputs of the FFT block are denoted {x0, x1, . . . ,x63}. A set of samples {a0,a1, . . . a7} for FHT is mapped to the FFT inputs {x0, . . . x63} using the following table. The rest of the FFT inputs are set to zero.

| Input for FHT | FFT ports |
|---|---|
| A0 | X0 |
| A1 | X32 |
| A2 | X8 |
| A3 | X40 |
| A4 | X2 |
| A5 | X34 |
| A6 | X10 |
| A7 | X42 |

The butterflies of Radix 4 FFT can be re-used for FHT if the intermediate values are properly routed between the butterflies. The butterfly re-use pattern for FHT is given in FIG. 5. The circles show butterflies of the 64-point Radix-4 FFT. The circles in gray are re-used for FHT.

Figure 2:
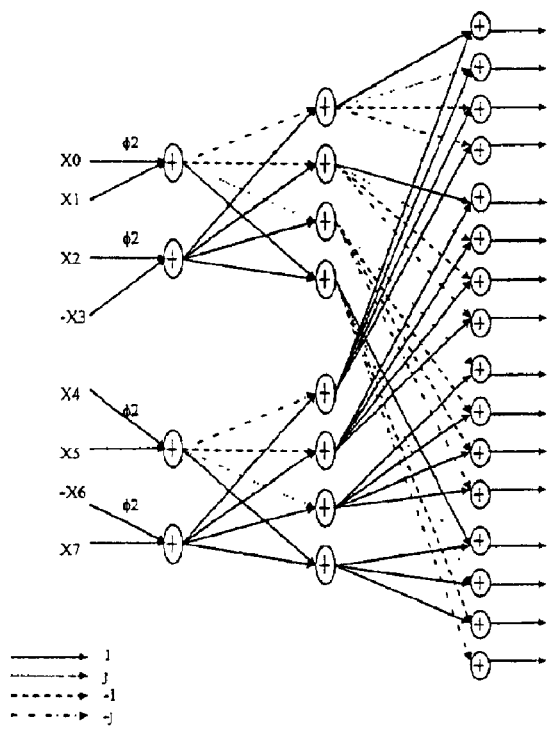
FIG. 2 shows an exemplary FHT topology.

FIG. 2 shows an exemplary Fast Hadamard Transform topology. This topology shows ¼th of the structure for a Fast Hadamard transform for input vector length 8. There are 8 inputs and 16 outputs. The same structure is repeated 4 times with different values of 2 to obtain the 64 output values.

Figure 4:
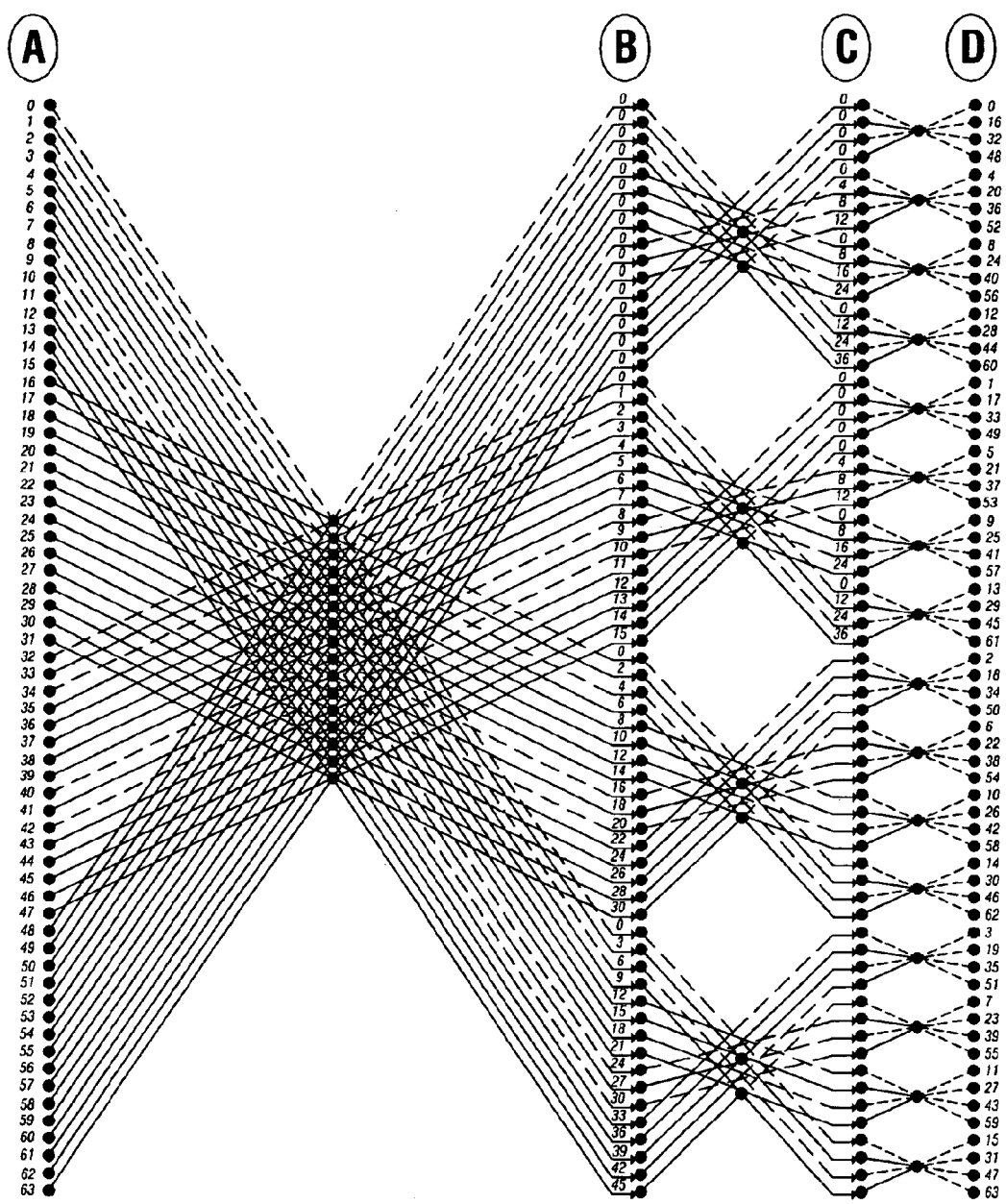
FIG. 4 shows an an example of Radix-4 64-point FFT topology being re-used for FHT
Figure 5:
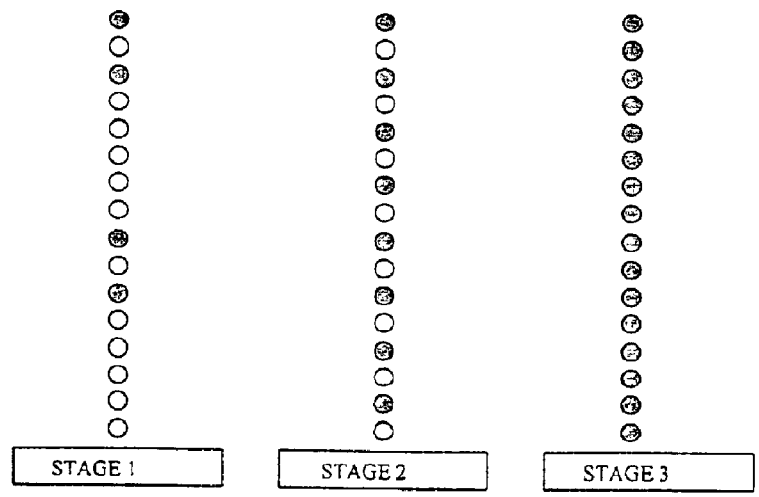
FIG. 5 shows an exemplary Butterfly re-use pattern of the engine of FIG. 2 to perform FHT processing.

FIG. 3 shows an exemplary 64-point Radix 4, Decimation in Frequency FFT structure with 64 inputs and 64 output. FIG. 4 shows the application of the 64-point Radix-4 FFT structure of FIG. 3 in computing a Fast Hadamard transform for input vector length 8 of FIG. 2. The mapping between the FFT input ports and the FHT input signals is given in Table 1. The dashed lines in FIG. 4 indicate the data flow for FHT. It can be seen from the figures that four of the FFT butterflies are re-used in the first stage, 8 of them in the second stage and 16 of them in the third stage. FIG. 5 shows an exemplary butterfly re-use pattern for re-using the Radix-4 DIF FFT engine for the computation of FHT. The circles represent the butterflies and the dark circles are re-used.

Figure 6:
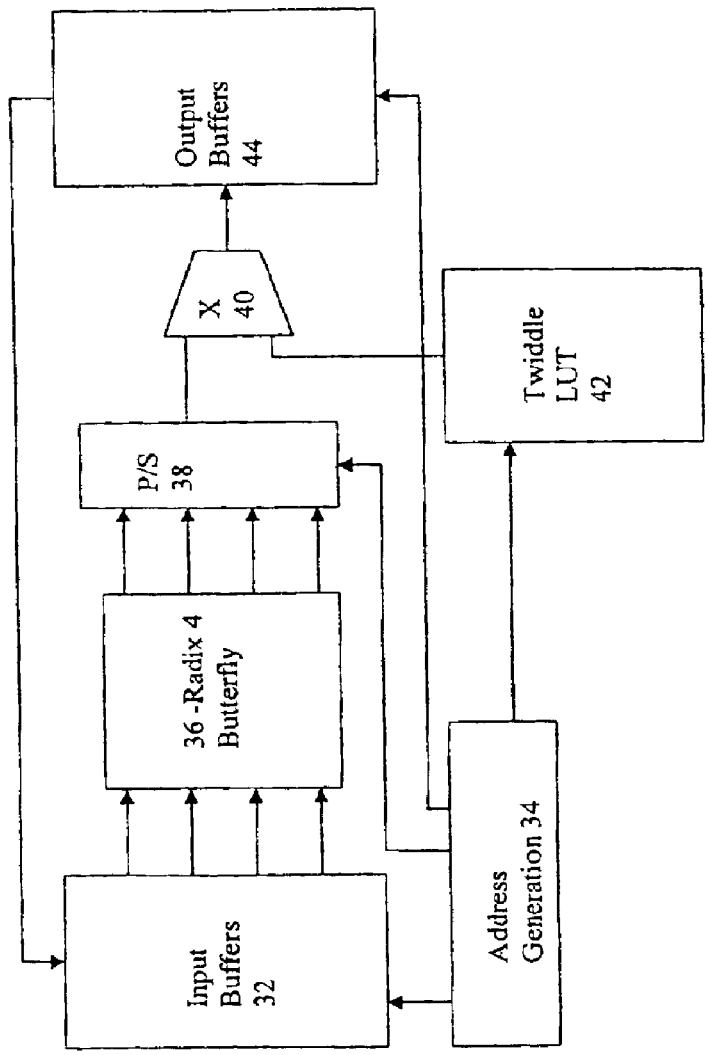
FIG. 6 shows one embodiment of a FFT/FHT engine.

FIG. 6 shows the exemplary engine 30 that can be programmably selected as an FFT engine or an FHT engine. The engine 30 has an input buffer 32 that receives data to be processed. The input buffer 32 is driven by an address generator 34. The output of the input buffer 32 is received by a butterfly unit 36. The output of the butterfly unit 36 is provided to a P/S unit 38. The address generator 34 also drives the P/S unit 38. The output of the P/S unit 38 is provided to one input of a complex multiplier 40, while a second input of the complex multiplier 40 receives the output of a twiddle LUT 42. The address generator 34 also drives the address input of the twiddle LUT 42. The output of the multiplier is saved in an output buffer 44 whose address input is driven by the address generator 34. The output of the output buffer 44 is presented to the channel decoder 70.

Figure 7:
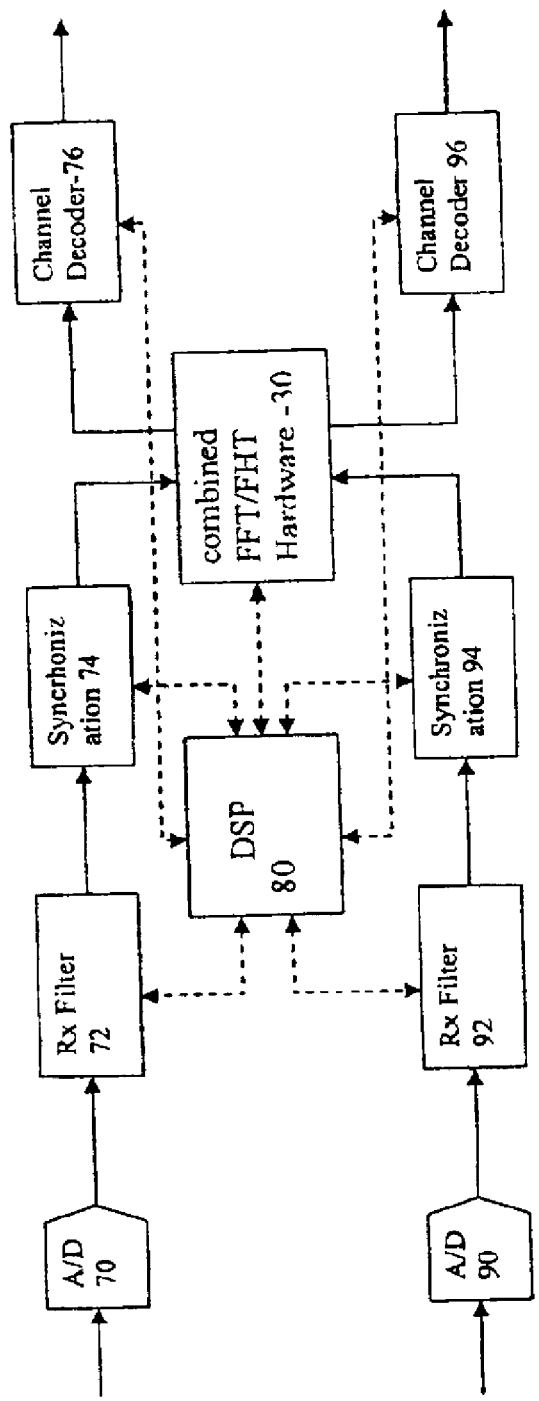
FIG. 7 shows an exemplary wireless based system that uses the FFT/FHT engine.

FIG. 7 shows a block diagram of an exemplary multi-mode wireless receiver which implements two protocols for non-simultaneous operation. Protocol 1 uses FFT algorithm for reception and Protocol 2 uses FHT algorithm. Radio signals are fed to an analog to digital (A/D) converter 70 and an A/D converter 90. The output of the A/D converter 70 is provided to a first receive filter 72, whose output is provided to a synchronizing circuit 74. The output of the synchronizing circuit 74 is provided to the combined FFT/FHT engine 30 (FIG. 6). The output of the FFT/FHT engine 30 is provided to first and second channel decoders 76 and 96, respectively. Correspondingly, the output of the A/D converter 90 is provided to a second receive filter 92, whose output is provided to a second synchronizing circuit 94, which in turn drives a second input of the combined FFT/FHT engine 30. A digital signal processor 80 coordinates and controls the filter, synchronizing circuit, combined FFT/FHT engine 30, and the channel decoders to provide output data.

As shown in FIG. 7, separate hardware blocks are used for the filtering and synchronization operation for these protocols. However, the FFT and FHT block is shown as shared between the protocols thus reducing the hardware requirement. A DSP core controls the operation of these hardware blocks. It also selects the mode of operation of the combined FFT-FHT block.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A transformation engine, comprising:
    an address generator;
    a butterfly unit coupled to the address generator, the butterfly unit to compute fast Hadamard transform (FHT) operations;
    a twiddle LUT coupled to the address generator; and
    a multiplier having a first input coupled to the butterfly unit and a second input coupled to the twiddle LUT.

2. The engine of claim 1, wherein the butterfly unit is further controlled to compute fast fourier transform (FFT) operations.

3. The engine of claim 1, wherein the butterfly unit is further controlled to compute decimation in frequency fast fourier transform (DIF FFT) operations.

4. The engine of claim 1, wherein the twiddle LUT contains twiddle factors set to one.

5. The engine of claim 1, wherein input data belonging to FHT samples are mapped to predetermined inputs of the transformation engine.

6. The engine of claim 1, further comprising an input buffer coupled to the butterfly unit.

7. The engine of claim 1, further comprising an output buffer coupled to the multiplier.

8. A method for performing a plurality of transformations, comprising:

determining a transformation operation to be performed on data; and sharing a transformation engine between multiple transformation operations including a fast Hadamard transformation (FHT) operation via setting twiddle factors to one.

9. The method of claim 8, further comprising setting the engine to select the transformation operation.

10. The method of claim 8, further comprising receiving an output of the transformation operation on the data.

11. The method of claim 8, further comprising selecting the transformation engine to perform FFT or FHT operations.

12. The method of claim 8, further comprising mapping input data belonging to FHT samples to predetermined inputs of the transformation engine.

13. The method of claim 12, further comprising setting remaining input data to zero.

14. The method of claim 8, further comprising processing a decimation in frequency FFT operation.

15. The method of claim 8, further comprising buffering input data and output data.

16. The method of claim 8, further comprising decoding radio frequency channel data from the transformed data.

* * * * *